United States Patent
Murakawa

(10) Patent No.: US 12,116,441 B2
(45) Date of Patent: Oct. 15, 2024

(54) POLYCARBONATE-MODIFIED ACRYLIC RESIN, PAINT, AND PLASTIC MOLDED ARTICLE PAINTED BY SAID PAINT

(71) Applicant: DIC Corporation, Tokyo (JP)

(72) Inventor: Taku Murakawa, Takaishi (JP)

(73) Assignee: DIC Corporation, Tokyo (JP)

( * ) Notice: Subject to any disclaimer, the term of this patent is extended or adjusted under 35 U.S.C. 154(b) by 779 days.

(21) Appl. No.: 17/271,290

(22) PCT Filed: Aug. 30, 2018

(86) PCT No.: PCT/JP2018/032100
§ 371 (c)(1),
(2) Date: Feb. 25, 2021

(87) PCT Pub. No.: WO2020/044487
PCT Pub. Date: Mar. 5, 2020

(65) Prior Publication Data
US 2021/0340299 A1  Nov. 4, 2021

(51) Int. Cl.
*C08F 283/02* (2006.01)
*C08J 7/04* (2020.01)
*C08J 7/043* (2020.01)
*C09D 151/08* (2006.01)
*C08G 64/22* (2006.01)
*C08G 64/30* (2006.01)

(52) U.S. Cl.
CPC .......... *C08F 283/02* (2013.01); *C08J 7/0427* (2020.01); *C08J 7/043* (2020.01); *C09D 151/08* (2013.01); *C08G 64/226* (2013.01); *C08G 64/305* (2013.01)

(58) Field of Classification Search
CPC ...... C08F 283/02; C09D 151/08; C08J 7/043; C08J 7/0427; C08G 64/305
See application file for complete search history.

(56) References Cited

U.S. PATENT DOCUMENTS

2014/0316051 A1* 10/2014 Schrinner ............. C08F 283/02
  524/507
2016/0229941 A1* 8/2016 Kuranari ................ C08J 7/0427

FOREIGN PATENT DOCUMENTS

JP  2015-067740 A  4/2015
WO  15/045562 A1  4/2015

OTHER PUBLICATIONS

International Search Report mailed Nov. 20, 2018, issued for PCT/JP2018/032100.
Supplementary European Search Report dated May 25, 2022, issued for European Patent Applicationn No. 18932209.2.

* cited by examiner

*Primary Examiner* — Robert D Harlan
(74) *Attorney, Agent, or Firm* — Locke Lord LLP; James E. Armstrong, IV; Nicholas J. DiCeglie, Jr.

(57) ABSTRACT

Provided is a polycarbonate-modified acrylic resin which is a reaction product of a polycarbonate diol (A) obtained by using 1,5-pentanediol and 1,6-hexanediol as raw materials, and an unsaturated monomer mixture (B) containing methyl methacrylate, an unsaturated monomer (b1) having a hydroxyl group, an unsaturated monomer (b2) having a carboxyl group, and an unsaturated monomer (b3) having an alkyl group having 2 to 8 carbon atoms as essential components, wherein the mass proportion of the unsaturated monomer (b2) in the unsaturated monomer mixture (B) is in the range of 2 to 10% by mass. The polycarbonate-modified acrylic resin is advantageous in that a coating film having high adhesion to a plastic substrate and having excellent water-resistant adhesive property and excellent fragrance resistance can be obtained from the resin, and therefore can be advantageously used in a coating composition.

12 Claims, No Drawings

POLYCARBONATE-MODIFIED ACRYLIC RESIN, PAINT, AND PLASTIC MOLDED ARTICLE PAINTED BY SAID PAINT

TECHNICAL FIELD

The present invention relates to a polycarbonate-modified acrylic resin, a coating composition, and a plastic molded article coated with the coating composition.

BACKGROUND ART

Conventionally, a polycarbonate-modified acrylic resin obtained by reacting unsaturated monomers in the presence of a polyol has been proposed, and a cured coating film obtained from the resin has been known to have excellent adhesion to a substrate and excellent mechanical physical properties and the like (see, for example, PTL 1).

The coating film obtained from the polycarbonate-modified acrylic resin has excellent resistance to marring and the like; however, the coating film has a disadvantage in that it is unsatisfactory with respect to the fragrance resistance which is required for a coating composition for plastic and the like in recent years. For removing such a disadvantage, there has been demanded a material which can impart a fragrance resistance as well as the conventional adhesion and the like.

CITATION LIST

Patent Literature

PTL 1: WO2015/045562

SUMMARY OF INVENTION

Technical Problem

An object to be achieved by the present invention is to provide a polycarbonate-modified acrylic resin which is advantageous in that a coating film having high adhesion to a plastic substrate and having excellent water-resistant adhesive property and excellent fragrance resistance can be obtained from the resin, a coating composition, and a plastic molded article coated with the coating composition.

Solution to Problem

The present inventor has conducted extensive and intensive studies with a view toward solving the above-mentioned problems. As a result, it has been found that, by using a polycarbonate-modified acrylic resin which is a reaction product of a specific polycarbonate diol, and an unsaturated monomer mixture containing a specific unsaturated monomer as an essential component, a coating film having high adhesion to a plastic substrate and having excellent water-resistant adhesive property and excellent fragrance resistance can be obtained, and the invention has been completed.

Specifically, the present invention is directed to a polycarbonate-modified acrylic resin which is a reaction product of a polycarbonate diol (A) obtained by using 1,5-pentanediol and 1,6-hexanediol as raw materials, and an unsaturated monomer mixture (B) containing methyl methacrylate, an unsaturated monomer (b1) having a hydroxyl group, an unsaturated monomer (b2) having a carboxyl group, and an unsaturated monomer (b3) having an alkyl group having 2 to 8 carbon atoms as essential components, wherein the mass proportion of the unsaturated monomer (b2) in the unsaturated monomer mixture (B) is in the range of 2 to 10% by mass, a coating composition, and a plastic molded article coated with the coating composition.

Advantageous Effects of Invention

The polycarbonate-modified acrylic resin of the invention is advantageous in that a coating film having high adhesion to a plastic substrate and having excellent water-resistant adhesive property and excellent fragrance resistance can be obtained from the resin, and therefore is advantageously used as a coating composition, and the coating composition can be used in coating various plastic molded articles. Therefore, the polycarbonate-modified acrylic resin of the invention can be advantageously used in a coating composition for coating various types of articles, e.g., housings for electronic devices, such as a cellular phone, a smartphone, a tablet terminal, a personal computer, a digital camera, and a game machine; housings for household appliances, such as a television set, a refrigerator, a washing machine, and an air conditioner; and interior trims for various vehicles, such as an automobile and a railway rolling stock.

DESCRIPTION OF EMBODIMENTS

The polycarbonate-modified acrylic resin of the present invention is a polycarbonate-modified acrylic resin which is a reaction product of a polycarbonate diol (A) obtained by using 1,5-pentanediol and 1,6-hexanediol as raw materials, and an unsaturated monomer mixture (B) containing methyl methacrylate, an unsaturated monomer (b1) having a hydroxyl group, an unsaturated monomer (b2) having a carboxyl group, and an unsaturated monomer (b3) having an alkyl group having 2 to 8 carbon atoms as essential components, wherein the mass proportion of the unsaturated monomer (b2) in the unsaturated monomer mixture (B) is in the range of 2 to 10% by mass.

The polycarbonate diol (A) is first described. The polycarbonate diol (A) is a polycarbonate diol obtained by using 1,5-pentanediol and 1,6-hexanediol as raw materials, and is obtained by, for example, a reaction of 1,5-pentanediol and 1,6-hexanediol with a carbonic acid ester or phosgene.

Next, the unsaturated monomer mixture (B) is described. The unsaturated monomer mixture (B) contains methyl methacrylate, an unsaturated monomer (b1) having a hydroxyl group, an unsaturated monomer (b2) having a carboxyl group, and an unsaturated monomer (b3) having an alkyl group having 2 to 8 carbon atoms as essential components, wherein the mass proportion of the unsaturated monomer (b2) in the unsaturated monomer mixture is in the range of 2 to 10% by mass.

Examples of the unsaturated monomers (b1) having a hydroxyl group include 2-hydroxyethyl (meth)acrylate, 3-hydroxypropyl (meth) acrylate, 4-hydroxy-n-butyl (meth)acrylate, 2-hydroxypropyl (meth)acrylate, 2-hydroxy-n-butyl (meth)acrylate, 3-hydroxy-n-butyl (meth)acrylate, 1,4-cyclohexanedimethanol mono(meth)acrylate, glycerol mono(meth)acrylate, polyoxyethylene mono(meth)acrylate, polyoxypropylene mono(meth)acrylate, polyoxybutylene mono(meth)acrylate, 2-hydroxy-3-phenoxypropyl (meth) acrylate, 2-(meth)acryloyloxyethyl-2-hydroxyethyl phthalate, and polycaprolactone-modified hydroxyethyl mono (meth)acrylate. Of these, in view of the obtained coating film which has excellent appearance, water-resistant adhesive property, and fragrance resistance, 2-hydroxyethyl (meth)acrylate is preferred. These unsaturated monomers (b1) can be used individually or in combination.

In the invention, the term "(meth)acrylic acid" means one of or both of methacrylic acid and acrylic acid, the term "(meth)acrylate" means one of or both of a methacrylate and an acrylate, and the term "(meth)acryloyl group" means one of or both of a methacryloyl group and an acryloyl group.

Examples of the unsaturated monomers (b2) having a carboxyl group include unsaturated monocarboxylic acids, such as (meth)acrylic acid, crotonic acid, β-carboxyethyl (meth) acrylate, ω-carboxy-polycaprolactone mono(meth) acrylate, 2-(meth)acryloyloxyethyl succinate, and 2-(meth) acryloyloxyethyl hexahydrophthalate; and unsaturated dicarboxylic acids, such as maleic acid, fumaric acid, and itaconic acid, or half esters of these unsaturated dicarboxylic acids. Of these, in view of the obtained coating film which has excellent fragrance resistance, (meth)acrylic acid is preferred. Further, these unsaturated monomers (b2) can be used individually or in combination.

Examples of the unsaturated monomers (b3) having an alkyl group having 2 to 8 carbon atoms include ethyl (meth)acrylate, n-propyl (meth)acrylate, isopropyl (meth) acrylate, n-butyl (meth)acrylate, isobutyl (meth)acrylate, t-butyl (meth)acrylate, n-pentyl (meth)acrylate, n-hexyl (meth)acrylate, n-heptyl (meth) acrylate, n-octyl (meth) acrylate, 2-ethylhexyl (meth)acrylate, and cyclohexyl (meth)acrylate. Further, these unsaturated monomers (b3) can be used individually or in combination.

Further, with respect to the component of the unsaturated monomer mixture (B), there may be used a monomer (b4) other than the above-mentioned methyl methacrylate, unsaturated monomer (b1), unsaturated monomer (b2), and unsaturated monomer (b3) which are essential raw materials. Examples of other monomers (b4) include methyl acrylate, nonyl (meth)acrylate, decyl (meth)acrylate, dodecyl (meth)acrylate, tridecyl (meth)acrylate, cetyl (meth)acrylate, stearyl (meth)acrylate, behenyl (meth) acrylate, 4-tert-butylcyclohexyl (meth) acrylate, isobornyl (meth) acrylate, dicyclopentanyl (meth) acrylate, benzyl (meth)acrylate; acrylamide, N,N-dimethyl(meth)acrylamide, (meth) acrylonitrile, 3-(meth)acryloyloxypropyltrimethoxysilane, N,N-dimethylaminoethyl (meth)acrylate, 2-(meth)acryloyloxyethyl acid phosphate, glycidyl (meth)acrylate, vinyl acetate, styrene, α-methylstyrene, p-methyl styrene, p-methoxystyrene, and diacrylate compounds, such as ethylene glycol diacrylate. Further, these unsaturated monomers can be used individually or in combination.

The mass proportion of the unsaturated monomer (b2) in the unsaturated monomer mixture (B) is in the range of 2 to 10% by mass, but, in view of the obtained coating film which has a further improved water-resistant adhesive property and fragrance resistance, the mass proportion of the unsaturated monomer (b2) in the unsaturated monomer mixture (B) is preferably in the range of 2.5 to 9% by mass, more preferably in the range of 3 to 8% by mass.

The unsaturated monomer mixture (B) contains methyl (meth)acrylate, the unsaturated monomer (b1), and the unsaturated monomer (b3) as well as the unsaturated monomer (b2) as essential components, but, in view of the obtained coating film which has excellent fragrance resistance, it is preferred that the mass proportion of the methyl (meth)acrylate in the unsaturated monomer mixture (B) is in the range of 30 to 95% by mass, the mass proportion of the unsaturated monomer (b1) in the unsaturated monomer mixture (B) is in the range of 1 to 40% by mass, and the mass proportion of the unsaturated monomer (b3) in the unsaturated monomer mixture (B) is in the range of 1 to 30% by mass, and it is more preferred that the mass proportion of the methyl (meth)acrylate in the unsaturated monomer mixture (B) is in the range of 55 to 90% by mass, the mass proportion of the unsaturated monomer (b1) in the unsaturated monomer mixture (B) is in the range of 3 to 30% by mass, and the mass proportion of the unsaturated monomer (b3) in the unsaturated monomer mixture (B) is in the range of 3 to 15% by mass.

Further, the glass transition temperature of the unsaturated monomer mixture (A) determined by a calculation using the FOX equation (hereinafter, referred to simply as "design Tg") is preferably in the range of 60 to 110° C. in view of the obtained coating film which has an improved chemical resistance.

In the invention, the glass transition temperature determined by a calculation using the FOX equation is a glass transition temperature determined by a calculation made in accordance with the following equation:

$$1/Tg = W1/Tg1 + W2/Tg2 + \ldots \qquad \text{FOX equation:}$$

wherein Tg: a glass transition temperature to be determined, W1: the weight fraction of the component 1, and Tg1: the glass transition temperature of a homopolymer of the component 1.

With respect to the glass transition temperature value of a homopolymer of each component, the values described in Polymer Handbook (4th Edition), written by J. Brandrup, E. H. Immergut, and E. A. Grulke (Wiley Interscience) were used.

With respect to the method for obtaining the polycarbonate-modified acrylic resin of the invention, preferred is a method in which, in the presence of the polycarbonate diol (A) and a solvent, the unsaturated monomer mixture (B) is subjected to radical polymerization because this method is simple and easy.

The above-mentioned radical polymerization method is a method in which monomers which are raw materials are dissolved in a solvent and subjected to polymerization reaction in the presence of a polymerization initiator. Examples of solvents usable in this method include aromatic hydrocarbon compounds, such as toluene and xylene; alicyclic hydrocarbon compounds, such as cyclohexane, methylcyclohexane, and ethylcyclohexane; ketone compounds, such as acetone, methyl ethyl ketone, methyl isobutyl ketone, and cyclohexanone; ester compounds, such as ethyl acetate, n-butyl acetate, isobutyl acetate, and propylene glycol monomethyl ether acetate; alcohol compounds, such as n-butanol, isopropyl alcohol, and cyclohexanol; glycol compounds, such as ethylene glycol monobutyl ether and propylene glycol monomethyl ether; and aliphatic hydrocarbon compounds, such as heptane, hexane, octane, and mineral turpentine.

Examples of the polymerization initiators include organic peroxides, for example, ketone peroxide compounds, such as cyclohexanone peroxide, 3,3,5-trimethylcyclohexanone peroxide, and methylcyclohexanone peroxide; peroxyketal compounds, such as 1,1-bis(tert-butylperoxy)-3,3,5-trimethylcyclohexane, 1,1-bis(tert-butylperoxy)cyclohexane, n-butyl-4,4-bis(tert-butylperoxy)valerate, 2,2-bis(4,4-di-tert-butylperoxycyclohexyl)propane, 2,2-bis(4,4-di-tert-amylperoxycyclohexyl)propane, 2,2-bis(4,4-di-tert-hexylperoxycyclohexyl)propane, 2,2-bis(4,4-di-tert-octylperoxycyclohexyl)propane, and 2,2-bis(4,4-dicumylperoxycyclohexyl)propane; hydroperoxide compounds, such as cumene hydroperoxide and 2,5-dimethylhexane-2,5-dihydroperoxide; dialkyl peroxide compounds, such as 1,3-bis(tert-butylperoxy-m-isopropyl)benzene, 2,5-dimethyl-2,5-di(tert-butylperoxy)hexane, diisopropylbenzene peroxide, tert-butylcumyl peroxide, and di-tert-butyl peroxide; diacyl peroxide compounds, such as decanoyl peroxide, lauroyl peroxide, benzoyl peroxide, and 2,4-dichlorobenzoyl peroxide; peroxycarbonate compounds, such as bis(tert-butylcyclohexyl) peroxydicarbonate; and peroxy ester compounds, such as tert-butyl peroxy-2-ethylhexanoate, tert-butyl peroxybenzoate, and 2,5-dimethyl-2,5-di(benzoylperoxy)hexane, and azo compounds, such as 2,2'-azobisisobutyronitrile, 2,2'-azobis(2-methyl)butyronitrile, and 1,1'-azobis(cyclohexane-1-carbonitrile).

Further, in view of the obtained coating film which has a further improved water-resistant adhesive property and fragrance resistance, the mass ratio of the polycarbonate diol (A) and the unsaturated monomer mixture (B) [(A)/(B)] is preferably in the range of 2/98 to 80/20, preferably in the range of 3/97 to 70/30, further preferably in the range of 4/96 to 60/40.

In view of the obtained coating film which has a further improved fragrance resistance, the polycarbonate-modified acrylic resin of the invention preferably has a hydroxyl value in the range of 20 to 150, more preferably in the range of 60 to 130.

In view of the obtained coating film which has a further improved water-resistant adhesive property and fragrance resistance, the polycarbonate-modified acrylic resin of the invention preferably has a weight average molecular weight (Mw) in the range of 2,000 to 50,000, more preferably in the range of 4,000 to 30,000. The weight average molecular weight (Mw) is a value determined using a conversion calibration curve obtained from the polystyrene as measured by gel permeation chromatography (hereinafter, abbreviated to "GPC").

The coating composition of the invention contains the polycarbonate-modified acrylic resin of the invention, and preferably contains a curing agent (C) in view of the obtained coating film which has further improved physical properties.

Examples of the curing agents (C) include a polyisocyanate compound and an amino resin, and, in view of the obtained coating film which has excellent water-resistant adhesive property and fragrance resistance, a polyisocyanate compound is preferred. Further, these curing agents (C) can be used individually or in combination.

Examples of the polyisocyanate compounds include aromatic diisocyanate compounds, such as tolylene diisocyanate, diphenylmethane diisocyanate, m-xylylene diisocyanate, and m-phenylenebis(dimethylmethylene) diisocyanate; and aliphatic or alicyclic diisocyanate compounds, such as hexamethylene diisocyanate, lysine diisocyanate, 1,3-bis(isocyanatomethyl)cyclohexane, 2-methyl-1,3-diisocyanatocyclohexane, 2-methyl-1,5-diisocyanatocyclohexane, 4,4'-dicyclohexylmethane diisocyanate, and isophorone diisocyanate.

Further, as the polyisocyanate compound, there can be used a prepolymer having an isocyanate group, which is obtained by subjecting the above-mentioned diisocyanate compound and a polyhydric alcohol to addition reaction; a compound having an isocyanurate ring, which is obtained by subjecting the diisocyanate compound to cyclotrimerization; a polyisocyanate compound having a urea bond or a biuret bond, which is obtained by reacting the diisocyanate compound with water; a homopolymer of an acrylic monomer having an isocyanate group, such as 2-isocyanatoethyl (meth)acrylate, 3-isopropenyl-α,α-dimethylbenzyl isocyanate, or (meth)acryloyl isocyanate; a copolymer having an isocyanate group, which is obtained by subjecting the above-mentioned acrylic monomer having an isocyanate group and a monomer, such as another acrylic monomer, a vinyl ester compound, a vinyl ether compound, an aromatic vinyl monomer, or a fluoroolefin, to copolymerization; and the like.

The above-mentioned polyisocyanate compounds can be used individually or in combination.

In the case where the curing agent (C) is a polyisocyanate compound, with respect to the amount of the polyisocyanate compound incorporated, from the viewpoint of obtaining a coating film having high strength, the equivalent ratio of the isocyanate group in the polyisocyanate compound to the hydroxyl group in the polycarbonate-modified acrylic resin of the invention (isocyanate group/hydroxyl group) is preferably in the range of 0.5 to 2.0, more preferably in the range of 0.7 to 1.3.

The above-mentioned urethane-forming reaction can be conducted in the presence of a urethane-forming reaction catalyst for accelerating the reaction. Examples of the urethane-forming reaction catalysts include amine compounds, such as triethylamine; organotin compounds, such as dibutyltin dioctate, dibutyltin dilaurate, dioctyltin dilaurate, octyltin trilaurate, dioctyltin dineodecanate, dibutyltin diacetate, dioctyltin diacetate, and tin dioctylate; and organometallic compounds, such as zinc octylate (zinc 2-ethylhexanoate).

The coating composition of the invention contains the polycarbonate-modified acrylic resin of the invention and the curing agent (C), and, as an additional material blended, an additive, such as a solvent, an anti-foaming agent, a viscosity modifier, a light stabilizer, a weathering stabilizer, a heat stabilizer, an ultraviolet light absorber, an antioxidant, a leveling agent, or a pigment dispersant, can be used. Further, a pigment, such as titanium oxide, calcium carbonate, an aluminum powder, a copper powder, a mica powder, iron oxide, carbon black, phthalocyanine blue, toluidine red, perylene, quinacridone, or Benzidine yellow, can be used.

The coating composition of the invention has high adhesion to a plastic substrate, and therefore can be advantageously used as a coating composition for coating various plastic molded articles, and examples of plastic molded articles which can be coated with the coating composition of the invention include housings for electronic devices, such as a cellular phone, a smartphone, a tablet terminal, a personal computer, a digital camera, and a game machine; housings for household appliances, such as a television set, a refrigerator, a washing machine, and an air conditioner; and interior trims for various vehicles, such as an automobile and a railway rolling stock.

Examples of coating methods for the coating composition of the invention include methods, such as spraying, an applicator, a bar coater, a gravure coater, a roll coater, a comma coater, a knife coater, an air-knife coater, a curtain coater, a kiss coater, a shower coater, a wheeler coater, a spin coater, dipping, and screen printing. Further, as a method in which, after coating, a coating film is obtained from the composition applied, there can be mentioned a method in which the applied composition is dried at a temperature in the range of from ordinary room temperature to 120° C.

EXAMPLES

Hereinbelow, the present invention will be described in more detail with reference to the following specific Examples. The hydroxyl value of the polycarbonate-modified acrylic resin of the invention is a value measured in accordance with JIS Test method K 0070-1992. Further, the weight average molecular weight (Mw) is a value measured under the below-shown conditions for GPC measurement.
[Conditions for GPC Measurement]
Measuring apparatus: High-speed GPC apparatus ("HLC-8220 GPC", manufactured by Tosoh Corp.)
Columns: The following columns, manufactured by Tosoh Corp., which were connected in series, were used.
"TSKgel G5000" (7.8 mm I.D.×30 cm)×1
"TSKgel G4000" (7.8 mm I.D.×30 cm)×1
"TSKgel G3000" (7.8 mm I.D.×30 cm)×1
"TSKgel G2000" (7.8 mm I.D.×30 cm)×1
Detector: RI (differential refractometer)
Column temperature: 40° C.
Eluent: Tetrahydrofuran (THF)
Flow rate: 1.0 mL/minute
Amount of sample per injection: 100 μL (tetrahydrofuran solution having a sample concentration of 4 mg/mL)
Standard sample: Using the monomodal polystyrenes shown below, a calibration curve was prepared.
(Monomodal Polystyrenes)
"TSKgel Standard polystyrene A-500", manufactured by Tosoh Corp.
"TSKgel Standard polystyrene A-1000", manufactured by Tosoh Corp.
"TSKgel Standard polystyrene A-2500", manufactured by Tosoh Corp.
"TSKgel Standard polystyrene A-5000", manufactured by Tosoh Corp.
"TSKgel Standard polystyrene F-1", manufactured by Tosoh Corp.
"TSKgel Standard polystyrene F-2", manufactured by Tosoh Corp.
"TSKgel Standard polystyrene F-4", manufactured by Tosoh Corp.
"TSKgel Standard polystyrene F-10", manufactured by Tosoh Corp.
"TSKgel Standard polystyrene F-20", manufactured by Tosoh Corp.
"TSKgel Standard polystyrene F-40", manufactured by Tosoh Corp.
"TSKgel Standard polystyrene F-80", manufactured by Tosoh Corp.
"TSKgel Standard polystyrene F-128", manufactured by Tosoh Corp.
"TSKgel Standard polystyrene F-288", manufactured by Tosoh Corp.
"TSKgel Standard polystyrene F-550", manufactured by Tosoh Corp.

Example 1: Synthesis of a Polycarbonate-Modified Acrylic Resin (1)

In a flask equipped with a condenser, a thermometer, a dropping funnel, and a stirrer were placed 50 parts by mass of a polycarbonate diol using 1,5-pentanediol and 1,6-hexanediol as raw materials ("DURANOL T5650J", manufactured by Asahi Kasei Chemicals Corporation; hydroxyl value: 139.5; number average molecular weight: 800; hereinafter, referred to simply as "polycarbonate diol (A-1)"), and 500 parts by mass of propylene glycol monomethyl ether acetate, and the temperature in the flask was increased to 120° C. Then, a mixture (design Tg: 79° C.) of 770 parts by mass of methyl methacrylate, 50 parts by mass of ethyl acrylate, 100 parts by mass of 2-hydroxyethyl acrylate, 30 parts by mass of methacrylic acid, 100 parts by mass of propylene glycol monomethyl ether acetate, and 40 parts by mass of tert-butyl peroxy-2-ethylhexanoate was dropwise added to the mixture in the flask over 5 hours. After completion of the addition, the reaction was continued at the same temperature for 17 hours, and then the resultant reaction mixture was diluted with propylene glycol monomethyl ether acetate so that the nonvolatile content of the resultant solution became 60% by mass, obtaining a solution of a polycarbonate-modified acrylic resin (1) having a mass ratio [(A)/(B)] of 5/95 and a weight average molecular weight of 12,600.

Example 2: Synthesis of a Polycarbonate-Modified Acrylic Resin (2)

In a flask equipped with a condenser, a thermometer, a dropping funnel, and a stirrer were placed 400 parts by mass of polycarbonate diol (A-1) and 500 parts by mass of propylene glycol monomethyl ether acetate, and the temperature in the flask was increased to 120° C. Then, a mixture (design Tg: 79° C.) of 450 parts by mass of methyl methacrylate, 30 parts by mass of ethyl acrylate, 70 parts by mass of 2-hydroxyethyl acrylate, 50 parts by mass of methacrylic acid, 100 parts by mass of propylene glycol monomethyl ether acetate, and 40 parts by mass of tert-butyl peroxy-2-ethylhexanoate was dropwise added to the mixture in the flask over 5 hours. After completion of the addition, the reaction was continued at the same temperature for 17 hours, and then the resultant reaction mixture was diluted with propylene glycol monomethyl ether acetate so that the nonvolatile content of the resultant solution became 60% by mass, obtaining a solution of a polycarbonate-modified acrylic resin (2) having a mass ratio [(A)/(B)] of 40/60 and a weight average molecular weight of 12,600.

Comparative Example 1: Synthesis of a Resin (R1) for Comparison

In a flask equipped with a condenser, a thermometer, a dropping funnel, and a stirrer was placed 500 parts by mass of propylene glycol monomethyl ether acetate, and the temperature in the flask was increased to 120° C. Then, a mixture (design Tg: 73° C.) of 770 parts by mass of methyl methacrylate, 50 parts by mass of ethyl acrylate, 150 parts by mass of 2-hydroxyethyl acrylate, 30 parts by mass of methacrylic acid, 100 parts by mass of propylene glycol monomethyl ether acetate, and 40 parts by mass of tert-butyl peroxy-2-ethylhexanoate was dropwise added to the ether acetate in the flask over 5 hours. After completion of the addition, the reaction was continued at the same temperature for 17 hours, and then the resultant reaction mixture was diluted with propylene glycol monomethyl ether acetate so that the nonvolatile content of the resultant solution became 60% by mass, obtaining a solution of a resin (R1) for comparison having a mass ratio [(A)/(B)] of 0/100 and a weight average molecular weight of 12,600.

Comparative Example 2: Synthesis of a Resin (R2) for Comparison

In a flask equipped with a condenser, a thermometer, a dropping funnel, and a stirrer were placed 50 parts by mass of polycarbonate diol (A-1) and 500 parts by mass of propylene glycol monomethyl ether acetate, and the temperature in the flask was increased to 120° C. Then, a mixture (design Tg: 82° C.) of 800 parts by mass of methyl methacrylate, 62 parts by mass of ethyl acrylate, 70 parts by mass of 2-hydroxyethyl acrylate, 18 parts by mass of methacrylic acid, 100 parts by mass of propylene glycol monomethyl ether acetate, and 40 parts by mass of tert-butyl peroxy-2-ethylhexanoate was dropwise added to the mixture in the flask over 5 hours. After completion of the addition, the reaction was continued at the same temperature for 17 hours, and then the resultant reaction mixture was diluted with propylene glycol monomethyl ether acetate so that the nonvolatile content of the resultant solution became 60% by mass, obtaining a solution of a resin (R2) for comparison having a mass ratio [(A)/(B)] of 5/95 and a weight average molecular weight of 14,600.

Comparative Example 3: Synthesis of a Resin (R3) for Comparison

In a flask equipped with a condenser, a thermometer, a dropping funnel, and a stirrer were placed 50 parts by mass of polycarbonate diol (A-1) and 500 parts by mass of propylene glycol monomethyl ether acetate, and the temperature in the flask was increased to 120° C. Then, a mixture (design Tg: 101° C.) of 750 parts by mass of methyl methacrylate, 20 parts by mass of ethyl acrylate, 70 parts by mass of 2-hydroxyethyl acrylate, 110 parts by mass of methacrylic acid, 100 parts by mass of propylene glycol monomethyl ether acetate, and 40 parts by mass of tert-butyl peroxy-2-ethylhexanoate was dropwise added to the mixture in the flask over 5 hours. After completion of the addition, the reaction was continued at the same temperature for 17 hours, and then the resultant reaction mixture was diluted with propylene glycol monomethyl ether acetate so that the nonvolatile content of the resultant solution became 60% by mass, obtaining a solution of a resin (R3) for comparison having a mass ratio [(A)/(B)] of 5/95 and a weight average molecular weight of 14,600.

The compositions of the above-obtained polycarbonate-modified acrylic resins (1), (2), and (R1) to (R3) are shown in Table 1.

incorporated, they were incorporated in such amounts that the ratio of the equivalent of the hydroxyl group in the polycarbonate-modified acrylic resin (1) and the equivalent of the isocyanate group in the curing agent became 1:1. Then, the resultant mixture was diluted with a mixed solvent (methyl isobutyl ketone/diacetone alcohol/ethyl acetate/isobutyl acetate=30/30/30/10 (mass ratio)) so that the viscosity of the resultant composition became 9 to 10 seconds (23° C.) as measured by "Viscosimeter NK-2", manufactured by Anest Iwata Corporation, preparing a coating composition (1).

[Preparation of a Cured Coating Film X for Evaluation]

The above-obtained coating composition (1) was applied to a PC (polycarbonate) substrate (50 mm×70 mm×1 mm) by spray coating so that the dried film had a thickness of 20 to 30 μm, and dried by heating using a dryer at 80° C. for 30 minutes, and then dried at 25° C. for 7 days to prepare a cured coating film for evaluation.

[Preparation of a Cured Coating Film Y for Evaluation]

The above-obtained coating composition (1) was applied to an ABS (acrylonitrile-butadiene-styrene copolymer) substrate (50 mm×70 mm×1 mm) by spray coating so that the dried film had a thickness of 20 to 30 μm, and dried by heating using a dryer at 80° C. for 30 minutes, and then dried at 25° C. for 7 days to prepare a cured coating film for evaluation.

[Evaluation of the Adhesion]

A lattice pattern with a width of 1 mm was cut in the above-obtained cured coating film X for evaluation using a cutter so that the number of lattices in the cut lattice pattern became 100. Then, a cellophane adhesive tape was put on the coating film so as to cover all the lattices, and quickly peeled off and this operation was repeated 4 times, and, from the number of the lattices that still adhered to the substrate, the adhesion was evaluated in accordance with the following criteria.

TABLE 1

| | | | Example 1 | Example 2 | Comparative Example 1 | Comparative Example 2 | Comparative Example 3 |
|---|---|---|---|---|---|---|---|
| Polycarbonate-modified acrylic resin | | | (1) | (2) | (R1) | (R2) | (R3) |
| Composition | Polycarbonate diol | (A-1) | 5 | 40 | | 5 | 5 |
| (Parts by mass) | Unsaturated monomer mixture | MMA | 77 | 45 | 77 | 80 | 75 |
| | | Unsaturated monomer (b1) HEMA | 10 | 7 | 15 | 7 | 7 |
| | | Unsaturated monomer (b2) MAA | 3 | 5 | 3 | 1.8 | 11 |
| | | Unsaturated monomer (b3) EA | 5 | 3 | 5 | 6.2 | 2 |
| | Mass proportion (%) of unsaturated monomer (b2) in unsaturated monomer mixture (B) | | 3.2 | 8.3 | 3 | 1.9 | 11.6 |
| | Polycarbonate diol/Unsaturated monomer mixture (Mass ratio) | | 5/95 | 40/60 | 0/100 | 5/95 | 5/95 |
| | Weight average molecular weight | | 12,600 | 14,600 | 12,600 | 14,600 | 14,600 |

The abbreviations shown in Table 1 are as follows.
MMA: Methyl methacrylate
HEMA: 2-Hydroxyethyl methacrylate
MAA: Methacrylic acid
EA: Ethyl acrylate Example 3: Preparation and Evaluation of a Coating Composition (1)

[Preparation of a Coating Composition]

The solution of polycarbonate-modified acrylic resin (1) obtained in Example 1 above (nonvolatile content: 60% by mass) and a curing agent ("Sumidur N-3300", manufactured by Sumika Covestro Urethane Co., Ltd.) were uniformly mixed with each other. With respect to the ratio of the polycarbonate-modified acrylic resin (1) and curing agent A: 100
B: 70 To 99
C: 69 Or less

[Evaluation of the Water-Resistant Adhesive Property]

The above-obtained cured coating film X for evaluation was immersed in water at 40° C. for 240 hours, and then the same procedure as in the above-mentioned evaluation of the adhesion was conducted, and the water-resistant adhesive property was evaluated in accordance with the following criteria.

A: 100
B: 70 To 99
C: 69 Or less

[Evaluation of the Fragrance Resistance]

A 15 mm×15 mm piece which was cut from a fragrance (Little Trees Air Freshener "Royal Pine") was placed on the above-obtained cured coating film Y for evaluation and, while applying a load using a weight of 500 g, dried at 74° C. for 4 hours, and then the fragrance was removed, and the appearance of the resultant coating film was visually observed, and the fragrance resistance was evaluated in accordance with the following criteria.

5: No trace of the fragrance.
4: A slight trace of the fragrance is on the coating film.
3: A trace of the fragrance is on the coating film.
2: The substrate is exposed.
1: Due to a tacky state, the fragrance cannot be removed from the substrate.

Example 4: Preparation and Evaluation of a Coating Composition (2)

A coating composition was prepared by performing the same procedure as in Example 3 except that the polycarbonate-modified acrylic resin (1) used in Example 3 was changed to the polycarbonate-modified acrylic resin (2), and then a cured coating film for evaluation was prepared, and each of the evaluations was conducted.

Comparative Examples 4 to 6: Preparation and Evaluation of Coating Compositions (R1) to (R3)

Coating compositions were individually prepared by performing the same procedure as in Example 8 except that the polycarbonate-modified acrylic resin (1) used in Example 3 was changed to the resins (R1) to (R3) for comparison, and then coating films for evaluation were individually prepared, and each of the evaluations was conducted.

The results of the evaluation of the above-obtained coating compositions (1) and (2) and coating compositions (R1) to (R3) are shown in Table 2.

TABLE 2

| | | Example 3 | Example 4 | Comparative Example 4 | Comparative Example 5 | Comparative Example 6 |
|---|---|---|---|---|---|---|
| Coating composition | | (1) | (2) | (R1) | (R2) | (R3) |
| Results of evaluation | Adhesion | A | A | C | A | A |
| | Water-resistant adhesive property | A | A | C | A | C |
| | Fragrance resistance | 5 | 3 | 5 | 2 | 5 |

The cured coating films obtained from Examples 1 and which correspond to the polycarbonate-modified acrylic resin of the invention were found to have excellent adhesion, excellent water-resistant adhesive property, and excellent fragrance resistance (Examples 3 and 4).

On the other hand, Comparative Example 1 is an example in which the acrylic resin is not modified with polycarbonate, and the obtained coating film was found to have poor adhesion to a substrate (Comparative Example 4).

Comparative Example 2 is an example in which the mass proportion of the unsaturated monomer having a carboxyl group in the unsaturated monomer mixture is smaller than 2% by mass which is the lower limit in the present invention, and the obtained cured coating film was found to have poor fragrance resistance (Comparative Example 5).

Comparative Example 3 is an example in which the mass proportion of the unsaturated monomer having a carboxyl group in the unsaturated monomer mixture is larger than 10% by mass which is the upper limit in the present invention, and the obtained cured coating film was found to have poor water-resistant adhesive property (Comparative Example 6).

The invention claimed is:

1. A polycarbonate-modified acrylic resin, which is a reaction product of a polycarbonate diol (A) obtained by using 1,5-pentanediol and 1,6-hexanediol as raw materials, and an unsaturated monomer mixture (B) containing:
    methyl methacrylate,
    an unsaturated monomer (b1) having a hydroxyl group,
    an unsaturated monomer (b2) having a carboxyl group, and
    an unsaturated monomer (b3) having an alkyl group having 2 to 8 carbon atoms
    as essential components,
    wherein the mass proportion of the unsaturated monomer (b2) in the unsaturated monomer mixture (B) is in the range of 2 to 10% by mass; and
    wherein the unsaturated monomer (b2) in the unsaturated monomer mixture (B) is one or more selected from the group consisting of (meth)acrylic acid, crotonic acid, β-carboxyethyl (meth) acrylate, ω-carboxy-polycaprolactone mono(meth)acrylate, 2-(meth)acryloyloxyethyl succinate, 2-(meth)acryloyloxyethyl hexahydrophthalate, maleic acid, fumaric acid, itaconic acid, and a half ester of one or more of maleic acid, fumaric acid, and itaconic acid.

2. The polycarbonate-modified acrylic resin according to claim 1, wherein the mass ratio of the polycarbonate diol (A) and the unsaturated monomer mixture (B) [(A)/(B)] is in the range of 2/98 to 80/20.

3. The polycarbonate-modified acrylic resin according to claim 1, wherein the mass proportion of the methyl methacrylate in the unsaturated monomer mixture (B) is in the range of 30 to 95% by mass, the mass proportion of the unsaturated monomer (b1) in the unsaturated monomer mixture (B) is in the range of 1 to 40% by mass, and the mass proportion of the unsaturated monomer (b3) in the unsaturated monomer mixture (B) is in the range of 1 to 30% by mass.

4. A coating composition comprising the polycarbonate-modified acrylic resin according to claim 1 and a curing agent (C).

5. A plastic molded article, which is coated with the coating composition according to claim 4.

6. The polycarbonate-modified acrylic resin according to claim 2, wherein the mass proportion of the methyl methacrylate in the unsaturated monomer mixture (B) is in the range of 30 to 95% by mass, the mass proportion of the unsaturated monomer (b1) in the unsaturated monomer mixture (B) is in the range of 1 to 40% by mass, and the mass proportion of the unsaturated monomer (b3) in the unsaturated monomer mixture (B) is in the range of 1 to 30% by mass.

7. A coating composition comprising the polycarbonate-modified acrylic resin according to claim 2 and a curing agent (C).

8. A coating composition comprising the polycarbonate-modified acrylic resin according to claim 3 and a curing agent (C).

9. A coating composition comprising the polycarbonate-modified acrylic resin according to claim 6 and a curing agent (C).

10. A plastic molded article, which is coated with the coating composition according to claim 7.

11. A plastic molded article, which is coated with the coating composition according to claim 8.

12. A plastic molded article, which is coated with the coating composition according to claim 9.

* * * * *